E. P. VIOLETTE.
PIE AND BISCUIT DOUGH MIXER.
APPLICATION FILED SEPT. 4, 1908.
927,387.
Patented July 6, 1909.
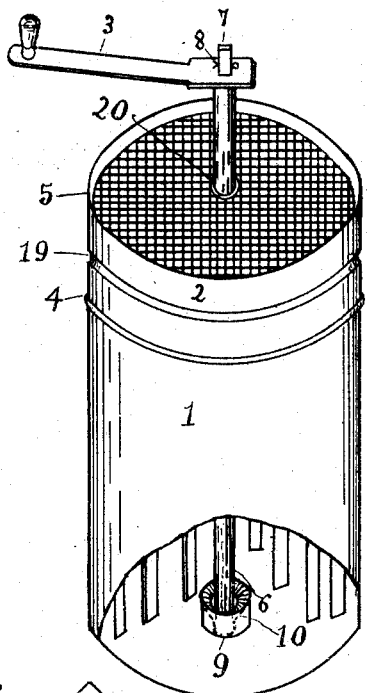
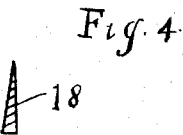
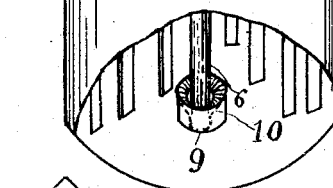
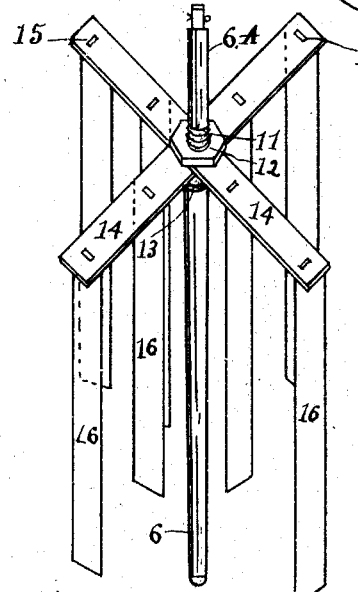
Witnesses
E. Brown.
J. P. Montgomery
Inventor,
Edward P. Violette
by
W. Stewart Brown, atty

UNITED STATES PATENT OFFICE.

EDWARD P. VIOLETTE, OF WICHITA, KANSAS.

PIE AND BISCUIT DOUGH MIXER.

No. 927,387.　　　　Specification of Letters Patent.　　　Patented July 6, 1909.

Application filed September 4, 1908. Serial No. 451,760.

*To all whom it may concern:*

Be it known that I, EDWARD P. VIOLETTE, a resident of Wichita, in the county of Sedgwick and State of Kansas, have invented certain new and useful Improvements in Pie and Biscuit Dough Mixers; and I do hereby declare the following to be a full, clear, and exact description of the invention, such as will enable others skilled in the art to which it appertains to make and use the same.

My invention relates to pie and biscuit dough mixers, and has for its object the promotion of sanitation and the more thorough incorporation of materials with a minimum amount of labor.

In the drawings forming a portion of this specification and in which similar numerals of reference designate like and corresponding parts, in the several views, Figure 1, is a view in perspective of my machine assembled ready for use. Fig. 2, is a perspective view of the mixer. Fig. 3, a section of one of the mixer-blades showing the tenon on one end thereof. Fig. 4, is a view in cross section of one of the mixer blades.

Referring to the drawings, 1, is a metallic vessel having a cap 2, said cap is provided with an inner rim 19. Above this rim and some distance below the top edge of said cap is soldered a sieve 5, in the center of said sieve is soldered a washer 20, which is for the purpose of making a bearing for the vertical shaft 6. The function of this sieve is to allow water to gradually percolate through on the dough while the mixer is being turned.

Referring to Fig. 2, a pair of bars 14, are provided with rectangular openings 15, and a round hole in the center thereof, said bars are mounted crosswise as shown on a shaft 6, having a collar 13, and are forced down on said collar and held rigid by a jam nut 11. From the threads 12 up, the portion of the shaft 6ᵃ, is reduced to allow the jam nut to drop down to the threads 12. The free end of the shaft is squared as seen at 7, to receive a crank 3, and is retained on said squared portion by a cotter pin 8. Blades 16, are provided with a rectangular tenon 17 which is driven into the rectangular openings 15, and is then riveted until rigid. Referring to Fig. 4, it will be seen one edge of said blades are sharp in order to cut through the dough. In the center of the bottom of said can is soldered a block of metal 9, having a tapered bore as indicated by the dotted lines 10, the object of the tapered bore is to provide for the entrance of the end of the shaft 6, when the vessel is filled with material.

Having described the construction and assembling of my apparatus I will now describe its operation generally. The material to be mixed is placed in the vessel, the mixer (Fig. 2) is placed in the vessel and the lower end of the shaft 6, is placed in the block 9, the cap 2, is placed over the vessel allowing the top end of the shaft 6ᴬ, to rest in the washer 20, attach the crank on the square end of the aforesaid shaft and put in the cotter-pin 8, and the apparatus is ready for operation. Turn the crank and pour water enough on the sieve to properly mix the dough.

Having described my apparatus what I claim is—

1. In a pie and biscuit dough mixer, a vessel having a removable cap and a sieve in said cap, a bearing in the center thereof, a block having a tapered bore located in the bottom of said vessel, means within said vessel for mixing the material within said vessel, substantially as set forth.

2. In a pie and biscuit dough mixer, a vessel having a removable cap, a sieve in said cap, a bearing in the center of said sieve, a block having a tapered bore, in the center of the bottom of said vessel, in combination with a shaft, a collar on said shaft, cross-bars mounted on said shaft, a jam nut to make rigid said bars on said shaft, rectangular openings in said bars and edged blades rigidly attached to said bars and a crank to rotate said shaft all as described.

In testimony whereof, I have signed this specification in the presence of two subscribing witnesses.

EDWARD P. VIOLETTE.

Witnesses:
　LEVI BOWERS,
　W. BROWN.